United States Patent
Peruzzotti et al.

(10) Patent No.: US 6,274,239 B1
(45) Date of Patent: Aug. 14, 2001

(54) INSULATION COATING FOR ELECTRIC CABLE CONTAINING POLYOLEFIN AND POLYMER WITH ESTER AND EPOXY GROUPS

(75) Inventors: Franco Peruzzotti, Legnano; Valeria Garcia, Brugherio, both of (IT)

(73) Assignee: Pirelli Cavi S.p.A., Milan (IT)

( * ) Notice: Subject to any disclaimer, the term of this patent is extended or adjusted under 35 U.S.C. 154(b) by 0 days.

(21) Appl. No.: 09/226,059

(22) Filed: Jan. 5, 1999

Related U.S. Application Data

(63) Continuation of application No. 08/654,280, filed on May 28, 1996, now abandoned.

(30) Foreign Application Priority Data

Jun. 21, 1995 (IT) .......................................... MI95A001330

(51) Int. Cl.$^7$ ............................ B32B 15/02; C08L 23/06; H01B 9/00; H01B 7/28
(52) U.S. Cl. .................................. 428/375; 174/105 SC; 174/110 PM; 174/121 SR; 525/208
(58) Field of Search ...................... 174/105 SC, 110 PM, 174/121 SR; 525/208; 428/375

(56) References Cited

U.S. PATENT DOCUMENTS

| 4,370,517 | * | 1/1983 | Soma et al. | .................... 174/110 PM |
| 5,252,676 | * | 10/1993 | Suyama et al. | ....................... 525/320 |

FOREIGN PATENT DOCUMENTS 48-95486 * 12/1973 (JP).
7-220536 * 8/1995 (JP).

* cited by examiner

*Primary Examiner*—Robert E. L. Sellers
(74) *Attorney, Agent, or Firm*—Norris, McLaughlin & Marcus

(57) ABSTRACT

A polymeric composition for coating electric cables for power transmission at medium/high voltage, having an improved resistance against the formation of the so-called water trees, comprises a polymeric polyolefin base including, in parts by weight to the total weight thereof, from 0.5 to 15 parts of ester groups and from 0.01 to 5 parts of epoxy groups. Electric cables according to the invention comprise at least one electrically conducting core (2) and an insulation coating (5) comprising the aforementioned polymeric composition.

3 Claims, 1 Drawing Sheet

Figure 1:
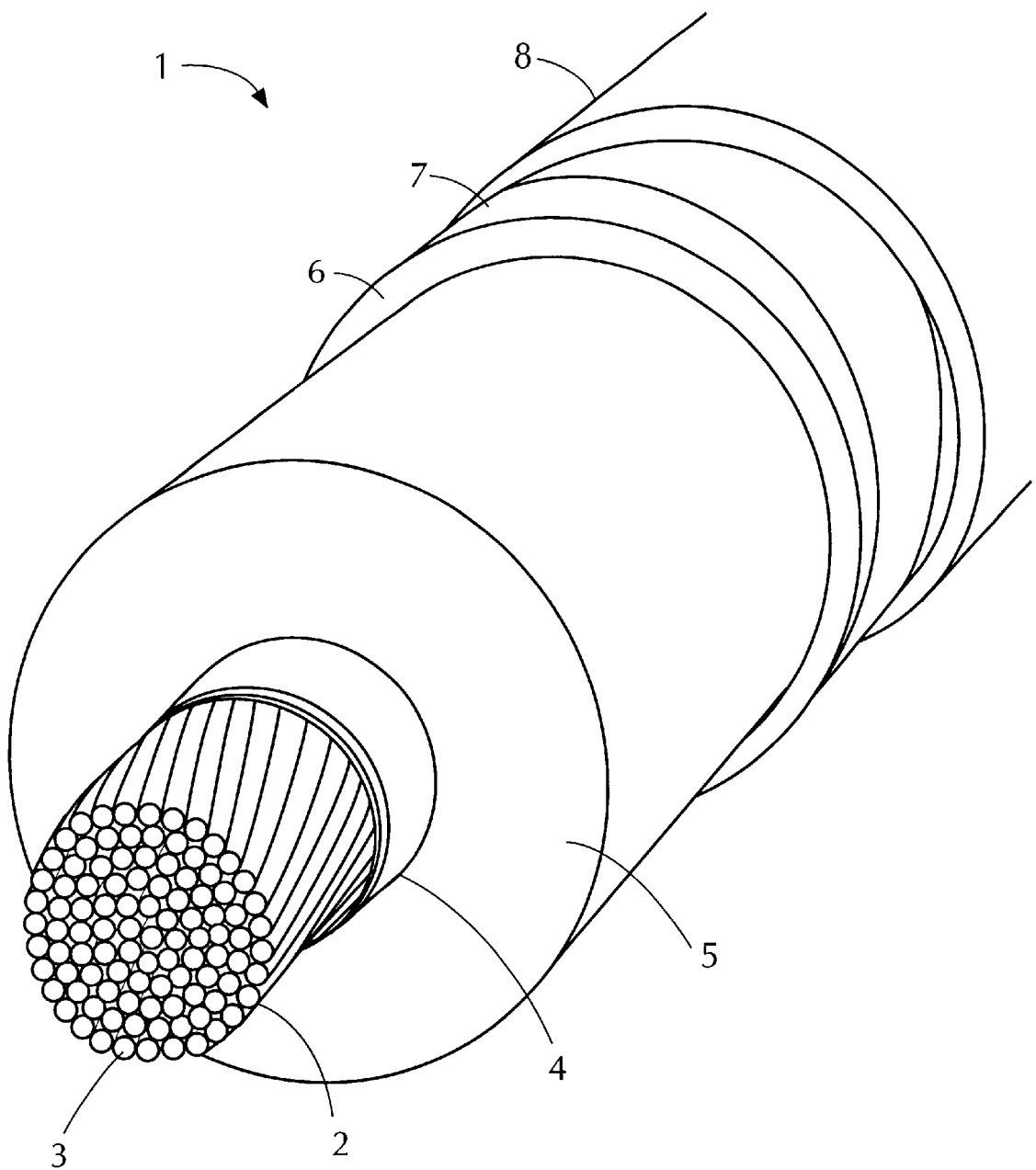

INSULATION COATING FOR ELECTRIC CABLE CONTAINING POLYOLEFIN AND POLYMER WITH ESTER AND EPOXY GROUPS

CROSS-REFERENCE TO RELATED APPLICATIONS

This application is a continuation of Ser. No. 08/654,280, filed May 28, 1996, abandoned.

DESCRIPTION

In a general aspect, the present invention relates to electric cables comprising at least one conducting core and at least one insulation coating comprising a polyolefin polymeric base.

More particularly, the present invention relates to an electric cable comprising an insulation coating having an improved resistance against the formation of the so-called water trees.

The present invention also relates to a polymeric composition which has a preferred, although not exclusive, use in the manufacture of an insulation coating in electric cables for power transmission at medium or high voltage.

In the following description, the terms: medium and high voltage, are used to indicate voltages of from 1 to 35 kV and, respectively, over 35 kV.

As is known, one of the more difficult problems to solve in the manufacture of electric cables for power transmission or energy cable, is that of ensuring that the insulation coating of the conducting core achieves an effective control of the electric field generated during the energy transmission, dissipates as little power as possible and preserves its dielectric and structural characteristics along time.

It is also known that to obtain such characteristics the best material for manufacturing the insulation coating is constituted by olefin polymers and in particular by polyethylene and copolymers or terpolymers thereof.

More particularly, among the latter, cross-linked polyethylene—commonly indicated by the acronym XLPE—has either good dieletric characteristics or a low loss factor (minimum dissipated power).

But together with these good characteristics, olefin polymers generally possess a low resistance against a particular degradation phenomenon, known in the art by the term: "water treeing", which may cause in time a degradation of the electric characteristic of the insulation material.

Such phenomenon essentially consists in the formation of microfractures having a branched shape (trees), progressively growing in time and responsible, in some cases, for an electric weakening of the insulation coating.

Even though the mechanism leading to the formation of these microfractures or weak zones has not yet been fully clarified, the formation of such zones or "trees" is anyhow attributed to the combined action of the electric field generated by the current flow in the conducting core of the cable and of the moisture existing in the inside of the insulation coating.

The problem represented by the formation of the above water trees is particularly felt in the cables for power transmission at medium or high voltage which are not provided with external protection elements, wherein the insulation coating may be directly in touch with water or anyhow with humid environments.

In order to reduce somehow the formation of water trees, different solutions have been proposed in the art, which are essentially based either on the selection of suitable polymeric materials for the manufacture of the insulation coatings, or on the use of suitable retarding additives, so-called tree-retardants.

So, for instance, it is known from U.S. Pat. No. 5,246,783 the use of an ethylene copolymer and of an alpha-olefin having 3 to 20 carbon atoms, having a molecular weight distribution of from 1.5 to 30 and a distribution index of the alpha-olefin comonomer greater than 45%.

European Patent EP 0 179 845 discloses, on the other hand, the combined use of an ethylene polymer or of an ethylene copolymer with an alpha-olefin, with an ethylene-alkylacrylate or an ethylene-alkylmethacrylate copolymer, in a cross-linkable coating composition resistant to the formation of water trees, for medium/high voltage energy cables.

As to the use of the so-called tree-retardant additives, it is known from the U.S. Pat. Nos. 4,212,756 and 4,144,202 the use of particular organo silanes comprising an acrylic/methacrylic group and, respectively, an epoxy group.

According to the present invention, it has now been found that the simultaneous presence of ester groups and epoxy groups in a polyolefin polymeric composition may impart to said composition a particular resistance to the phenomenon of water trees in the working condition of an electric cable.

According to the invention, in fact, a surprising synergistic effect—in terms of increased resistance to the water treeing phenomenon—has been observed, due to the simultaneous presence of ester groups and epoxy groups within a selected concentration range.

When the aforementioned groups are simultaneously present in the polymeric base forming the insulation coating of the cable, it has been noticed in particular that the retarding effect against water tree formation is evidently greater than the sum of the effects of the same groups when the latter are present alone.

According to a first aspect thereof, the present invention therefore provides an electric cable comprising at least a conductor and at least an insulation coating comprising a polyolefin polymeric base, which is characterized in that said polyolefin polymeric base comprises, in parts by weight to the total weight of the same:

from 0.5 to 15 parts of ester groups; and
from 0.01 to 5 parts of epoxy groups.

According to a further aspect of the invention, the problem of an adequate resistance to the phenomenon of water trees is therefore solved by a cable which is characterized in that said polyolefin polymeric base comprises a first predetermined amount of ester groups and a second predetermined amount of epoxy groups, said first and second predetermined amounts being such as to reduce the water tree formation in the insulation coating material after electric ageing in water.

In the following description and the subsequent claims, the term: electric water ageing, is used to indicate an ageing treatment of the insulation coating carried out in water and in the presence of an electric field such as—for instance—the treatment proposed by EFI (Norwegian Electric Power Research Institute), illustrated below, or analogous treatments well known in the art.

According to a further aspect thereof, the present invention also provides a polyolefin polymeric composition resistant to water treeing, in particular for the manufacture of an insulation coating for electric cables, which is characterized in that it comprises—in parts by weight to the total weight thereof—from 0.05 to 15 parts of ester groups and from 0.01 to 5 parts of epoxy groups.

In the following description and the subsequent claims, the term: polyolefin polymeric base, is used to indicate a polymer selected from the group comprising high-, medium- and low-density polyethylene homopolymers, ethylene copolymers and ethylene terpolymers with an alpha-olefin having 3 to 20 carbon atoms, ethylene-alpha-olefin-diene terpolymers and mixtures thereof.

The term: polyolefin polymeric composition, on the other hand, is used to indicate a polymeric composition comprising a polyolefin polymeric base of the above defined type.

Preferably, the polyolefin polymeric base of the invention is an ethylene polymer selected from the group comprising: polyethylene, copolymers obtainable by polymerizing ethylene with at least one alpha-olefin, linear or branched, having 3 to 14 carbon atoms, terpolymers obtainable by polymerizing ethylene, an alpha-olefin, linear or branched, having 3 to 14 carbon atoms and a diene having 4 to 25 carbon atoms having a density (measured according to ASTM D-792) of from 0.860 g/cm$^3$ to 0.940 g/cm$^3$ and a Melt Index (measured according to ASTM D-1238) of from 0.1 g/10' to 40 g/10'.

In the terpolymers of the invention, the above diene is preferably selected from the group comprising: 1,4 pentadiene, 1,4 hexadiene, 1,5 hexadiene, dicyclopentadiene, 4-vinyl-cyclohexene, 1-vinyl-1-cyclopentene, ethyl norbornene (LNB), alkylbicyclononadiene, indene, norbornene and mixtures thereof.

According to the invention, it has been observed that to achieve an adequate resistance to the water tree formation, the polyolefin matrix forming the insulation coating of the cable conducting core should preferably comprise at least 0.5% by weight of ester groups and at least 0.01% by weight of epoxy groups.

On the other hand, it has been observed that amounts exceding 15% by weight of ester groups and, respectively, 5% by weight of epoxy groups do not produce a substantial additional benefit in terms of resistance to the phenomenon of water trees, against a marked increase in the power dissipated by the insulation coating (increase of the loss factor or tg delta), with ensuing increase in the energy transmission costs.

According to the invention, is has also been observed that the aforementioned improved resistance to the water trees formation is not substantially affected by the way in which the ester groups and the epoxy groups are incorporated into the polymeric composition, provided that these groups are present in the aforementioned amounts, as indicated above.

So, for instance, in a first embodiment of the invention, a polymeric composition comprising the above minimum amount of ester groups and epoxy groups may be prepared by adding to a polyolefin polymeric base a first compound, either polymeric or not, incorporating an ester group and, respectively, a second compound, either polymeric or not, incorporating an epoxy group.

Preferably, the above compound incorporating an ester group is an acrylic or vinyl polymer selected from the group comprising:

i) copolymers obtainable by polymerizing ethylene with at least an acrylic ester of the formula:

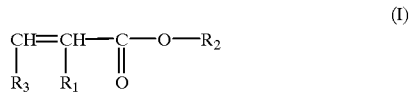

wherein $R_1$ is H or $CH_3$, $R_2$ is an alkyl or aryl hydrocarbon group, linear or branched, preferably a phenyl, having 1 to 10 carbon atoms, and $R_3$ is hydrogen or an alkyl or aryl hydrocarbon group, preferably a phenyl, linear or branched, having 1 to 10 carbon atoms;

ii) copolymers obtainable by polymerizing ethylene with at least a vinyl ester of a carboxylic acid of the formula:

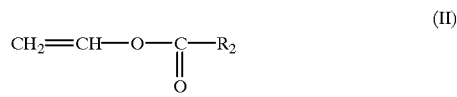

wherein $R_2$ is an alkyl or aryl hydrocarbon group, linear or branched, preferably a phenyl, having 1 to 10 carbon atoms.

For the purposes of the invention, the acrylic copolymers having the formula (I) of preferred use comprise ethylene copolymers with a comonomer selected from the group comprising the following acrylic esters: methyl acrylate, ethyl acrylate, propyl acrylate, n-butyl acrylate, iso-butyl acrylate, methyl methacrylate, ethyl methacrylate, and mixtures thereof.

Among them, particularly preferred are the acrylic ester-ethylene copolymers and, more particularly, those having an amount of acrylic comonomer of from 2% to 40% by weight, such as for instance those commercially available under the trade names ENATHENE EA™ (Quantum Chemical Corporation, Cincinnati, Ohio, U.S.A.), OPTEMA™ (Exxon Chemical) and LOTRYL™ (Elf Atochem).

For the purposes of the invention, the vinyl copolymers of preferred use comprise ethylene copolymers with a comonomer selected from the group comprising vinyl acetate and vinyl propionate, such as for instance those commercially available under the trade names LEVAPREN™ (Bayer), ESCORENE™ (Exxon Chemical), ELVAX™ (Du Pont de Nemours International S.A.) and EVATANE™ (Elf Atochem).

According to an advantageous aspect of the invention, optimal homogeneity characteristics of the polymeric composition may be achieved when the acrylic or vinyl copolymers having the formula (I) and (II) have a Melt Index value near that of the polyolefin polymeric base in which they may be easily incorporated.

For the purposes of the invention, such Melt Index value (measured according to ASTM D-1238) preferably ranges from 0.1 g/10' to 40 g/10'.

According to a preferred embodiment, the above amount of ester groups may be reached when the polymeric composition comprises at least 5% by weight of the above acrylic or vinyl polymers having the formula (I) and (II), or greater values depending upon the ester groups content within said polymers.

Furthermore, the polymeric composition of the invention preferably comprises from 5% to 40% by weight of the aforementioned acrylic or vinyl polmers having the formula (I) and (II).

According to the invention, the above-identified compound incorporating an epoxy group may be:

a) a glycidyl ether of the formula:

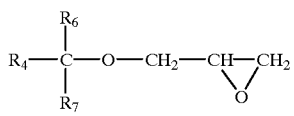

(III)

wherein $R_4$, $R_6$ and $R_7$ are independently a hydrogen atom, an alkyl or aryl hydrocarbon group, linear or branched, preferably an optionally substituted phenyl, having 1 to 25 carbon atoms or a glycidyl ether group of the formula:

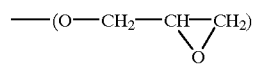

b) a polyfunctional derivative of the glycidyl ether of formula (III), or
c) an epoxy resin.

For the purposes of the invention, the glycidyl ethers having the formula (III) may be mono-, bi-, tri- or tetrafunctional; those of preferred use are mono- and bifunctional glycidyl ethers selected from the group comprising: p-t-butyl-phenyl-glycidyl ether, 2-ethyl-hexyl-glycidyl ether, dodecyl-glycidyl ether, tetradecyl-glycidyl ether, glycidyl-isopropyl-etherbutyl-glycidyl ether, 1,4-butanediol-diglycidyl ether, 1,6-hexen-diol-diglycidyl ether and mixtures thereof.

Epoxy resins of preferred use comprise instead resins of the aliphatic, cycloaliphatic or aromatic type, preferably having a dynamic viscosity at 25° C. of from 60 to 55,000 mPa x s, preferably between 7,000 and 10,000 mPa x s, and an epoxy content (measured according to ASTM D-1652) of from 0.1 to 0.7 gram eq/100 g of resin, preferably between 0.53 and 0.55 gram eq/100 g of resin.

Examples of such resins are those commercially available under the trade name EUREPOX™ (SCHERING) and preferably those named EUREPOX™ 730.

Preferably, the polymeric composition comprises from 0.2 to 10% by weight of at least one glicydyl ether having the formula (III) or polyfunctional derivatives thereof and/or from 0.2 to 10% by weight of said epoxy resin, so as to reach the aforementioned amount of epoxy groups indicated hereinabove.

According to a further embodiment of the invention, the above-identified minimum amount of ester groups and epoxy groups may be reached by adding to a polyolefin polymeric base a compound, either polymeric or not, incorporating either an ester group or an epoxy group.

Bifunctional compounds of preferred and advantageous use are, more particularly, those selected from the group comprising the glycidyl esters of the formula:

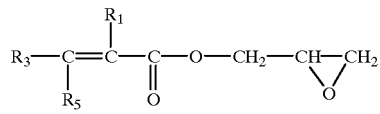

(IV)

wherein $R_3$ and $R_5$ are independently H, an alkyl or aryl hydrocarbon group, linear or branched, preferably a phenyl, having 1 to 10 carbon atoms; $R_1$ is H or $CH_3$.

Among them, the glycidyl esters of the acrylic or methacrylic acid are preferred.

For the purposes of the invention, particularly preferred is glycidyl methacrylate (GMA), commercially available under the trade name BLEMMER G™ (Blemmer Chemical Corp.).

In this case, the aforementioned amount of ester and epoxy groups may be reached when the polymeric composition preferably comprises from 0.03 to 15% by weight of at least a glycidyl ester having the formula (IV).

Bifunctional compounds of the polymeric type of preferred and advantageous use are those selected from the group comprising:

a) terpolymers obtainable by polymerizing ethylene with:
   i) at least one acrylic ester of the formula:

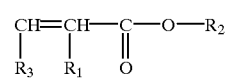

(I)

wherein $R_1$ is H or $CH_3$, $R_2$ is an alkyl or aryl hydrocarbon group, linear or branched, preferably a phenyl, having 1 to 10 carbon atoms and $R_3$ is hydrogen or an alkyl or aryl hydrocarbon group, preferably a phenyl, linear or branched, having 1 to 10 carbon atoms;
   ii) at least one glycidyl ester of the formula:

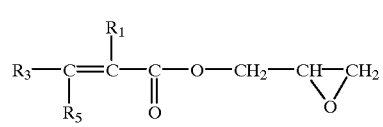

(IV)

wherein the meaning of $R_1$, $R_3$ and $R_5$ are those indicated hereinabove;

b) terpolymers obtainable by polymerizing ethylene with:
   i) at least one vinyl ester of a carboxylic acid of the formula:

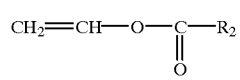

(II)

wherein $R_2$ is an alkyl or aryl hydrocarbon group, linear or branched, preferably a phenyl, having 1 to 10 carbon atoms;
   ii) at least one glycidyl ester of the formula:

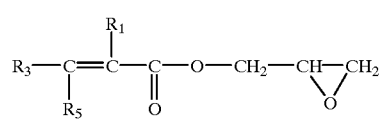

(IV)

wherein the meaning of $R_1$, $R_3$ and $R_5$ are those indicated hereinabove;

c) copolymers obtainable by polymerizing ethylene with at least one glycidyl ester of the formula:

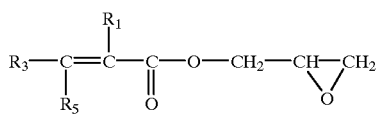

(IV)

wherein $R_3$ and $R_5$ are independently H, an alkyl or aryl hydrocarbon group, linear or branched, preferably a phenyl, having 1 to 10 carbon atoms; $R_1$ is H or $CH_3$.

Also in these cases, glycidyl esters having the formula (IV) of preferred use are the glycidyl esters of the acrylic or methacrylic acids and, particularly, glycidyl methacrylate.

Ethylene/acrylic ester/glycidyl methacrylate terpolymers and ethylene/glycidyl methacrylate copolymers of preferred and advantageous use are commercially available under the trade names LOTADER™ GMA AX8900 and LOTADER™ GMA AX8840 (Elf Atochem), respectively.

As previously explained, in this case too optimum homogeneity characteristics of the polymeric composition may be obtained when the above bifunctional terpolymers or copolymers have a Melt Index of from 0.1 g/10' to 40 g/10'.

In this case, the aforementioned amount of ester and epoxy groups may be reached when the polymeric composition comprises from 3 to 30% by weight of at least an ethylene/acrylic ester/glycidyl methacrylate terpolymer or ethylene/vinyl ester/glycidyl methacrylate terpolymer and from 1 to 40% by weight of at least an ethylene/glycidyl methacrylate copolymer.

Obviously, both the bifunctional compounds, either polymeric or not, may be used in the polymeric composition of the invention, either alone or combined with the aforementioned monofunctional compounds (acrylic or vinyl polymers, glycidyl ether, epoxy resin), so as to reach the desired amount of ester and epoxy groups.

According to a further aspect thereof, the present invention relates to a new use of one of the above bifunctional compounds—either polymeric or not—incorporating either an ester group or an epoxy group, as a tree retardant additive in a polymeric composition for coating an electric cable.

In fact, it is advantageously possible to confer to a polyolefin polymeric base the desired characteristics of resistance to the water treeing phenomenon by simply adding said bifunctional compounds to said base in the aforementioned amounts.

Preferably, the amount of the ester and epoxy groups falls within said range of 0.5–15% parts by weight and, respectively, of 0.01–5% parts by eight to the total weight of the composition so obtained.

In a preferred embodiment, the polymeric composition of the invention is cross-linked by means of one of the methods known in the art to this end.

Preferably, the polymeric composition is chemically cross-linked; for this purpose, it incorporates an effective amount of at least one cross-linking agent, such as for instance tert-butyl-cumyl peroxide.

In order to achieve an improved stability, furthermore, the polymeric composition of the invention advantageously incorporates an effective amount of at least one antioxidant agent, such as for instance 4,4'-thio-bis(3-methyl-6-ter-butyl)phenol.

Depending upon the particular use of the cable, moreover, the olymeric composition of the invention may incorporate other additives and fillers conventional in themselves, such as for instance pigments, dyes, stabilizers, lubricants, etc.

Further advantages and characteristics of the invention will be better apparent from the following description of some preferred embodiments thereof, which are reported in the following by way of non-limitative illustration, with reference to FIG. 1, whose only figure shows, in perspective view and partial cross-section, a cable according to the invention.

In FIG. 1, reference 1 indicates a cable comprising an electric conducting core 2 including a plurality of wires, i.e. of copper, all indicated by 3.

The conducting core 2 is enclosed within several coaxial coating layers, including an inner semiconducting layer 4, an insulation layer 5, an outer semiconducting layer 6, a metal screen 7 and an outer polymeric sheath 8.

The above described cable 1 may be produced starting from the conducting core 2 according to known methods, for instance by subsequently extruding layers 4, 5 and 6, by applying the metal screen 7 and by finally extruding the external sheath 8.

With reference to the description hereinabove, some merely illustrative and not limitative examples of polymeric compositions according to the invention, particularly suitable for the manufacture of the insulation layer of a cable, such as for instance the layer 5 of the cable described above, will be provided in the following.

EXAMPLE 1

A polymeric composition according to the invention was prepared by mixing in an extruder the following ingredients, in parts by weight for each 100 parts of polymeric base (phr):

| | |
|---|---|
| polymeric base | 90 phr |
| ethylene/acrylic ester/glycidyl methacrylate terpolymer | 10 phr |
| peroxide | 2 phr |
| antioxidant | 0.34 phr |

As polymeric base low-density polyethylene (LDPE) was used, having a density of 0.923 g/cm³ and a Melt Flow Index of 2 g/10' (Enichem).

As ethylene/acrylic ester/glydidyl methacrylate terpolymer, LOTADER™ GMA AX$_{8900}$™ (Elf Atochem) was used.

The peroxide and the antioxidant used were ter-butyl-cumyl peroxide (TRIGONOX™ T produced by AKZO) and 4-4'-thio-bis(3-methyl-6-ter-butyl)phenol (SANTONOX™R produced by MONSANTO).

EXAMPLE 2

According to the same preparation methods and using the same ingredients as the previous Example 1, a polymeric composition was prepared having the following composition in parts by weight for each 100 parts of polymeric base (phr):

| | |
|---|---|
| polymeric base | 85 phr |
| ethylene/acrylic ester/glycidyl methacrylate terpolymer | 15 phr |
| peroxide | 2 phr |
| antioxidant | 0.34 phr |

EXAMPLE 3

According to the same preparation methods and using the same ingredients as the previous Example 1, a polymeric composition was prepared having the following composition in parts by weight for each 100 parts of polymeric base (phr):

| polymeric base | 80 phr |
|---|---|
| ethylene/acrylic ester/glycidyl methacrylate terpolymer | 20 phr |
| peroxide | 2 phr |
| antioxidant | 0.34 phr |

EXAMPLE 4
(Comparison)

According to conventional preparation methods known in the art and using the same ingredients of the previous Example 1, a polymeric composition including only the polyolefin polymer, the cross-linking agent and the antioxidant agent was prepared, having the following composition in parts by weight for each 100 parts of polymeric base (phr):

| polymeric base | 100 phr |
|---|---|
| peroxide | 2 phr |
| antioxidant | 0.34 phr |

EXAMPLE 5
(Comparison)

According to conventional preparation methods known in the art and using the same ingredients of the previous Example 1, a polymeric composition including acrylic ester groups was prepared, having the following composition in parts by weight for each 100 parts of polymeric base (phr):

| polymeric base | 82.5 phr |
|---|---|
| ethylene/acrylic-ester copolymer | 17.5 phr |
| peroxide | 2 phr |
| antioxidant | 0.34 phr |

As ethylene/acrylic-ester copolymer the ethylene/butyl acrylate copolymer commercially available under the trade name ENATHENE™ EA 720 (USI QUANTUM) was used.

EXAMPLE 6
(Comparison)

According to conventional preparation methods known in the art and using the same ingredients of the previous Example 1, a polymeric composition according to the prior art and including epoxy groups was prepared, having the following composition in parts by weight for each 100 parts of polymeric base (phr):

| polymeric base | 100 phr |
|---|---|
| epoxy resin | 1.5 phr |
| peroxide | 2 phr |
| antioxidant | 0.34 phr |

As epoxy resin the resin commercially available under the trade name EUREPOX™ (SCHERING) was used.

EXAMPLE 7
(Evaluation of the Water Tree Resistance)

The resistance properties to the formation of water trees of the polymeric compositions according to Examples 1–6 hereinabove, were evaluated according to the methodology proposed by EFI (Norwegian Electric Power Research Institute) in the publication "The EFI Test Method for Accelerated Growth of Water Trees", presented at the "1990 IEEE International Symposium on Electrical Insulation", held in Toronto, Canada, on Jun. 3–6, 1990.

According to such a methodology, the cable is simulated by preparing cup-shaped multilayered test-samples, wherein the material constituting the insulation coating is sandwiched between two layers of semiconducting material.

More particularly, the layer of insulation material is heat-moulded in the shape of a cup at the temperature of 120° C., starting from a tape having a thickness of 5–7 mm, in an electric press capable of developing a pressure of about 90 t, so as to obtain a thickness of about 0.50 mm.

The layers of semiconducting material, extruded and preshaped in an analogous way until a thickness of about 0.5 mm is obtained, are then pressed and heat-welded on opposite sides of the insulation layer at a temperature of about 180° C. for 15 minutes in an electric press similar to that used to form the same layers.

The test-samples so obtained, once cooled at room temperature, are then submitted to an accelerated electric ageing test, filling with water the cavity defined inside the cup-shaped test-sample, immersing in the water a high voltage electrode and laying the resulting equipment on a metal plate (earth electrode).

The accelerated trees growth is then induced in the insulation layer by applying a voltage generally of from 2 to 15 kV between the electrodes.

In order to further accelerate the phenomenon, the test is heat-performed, for instance in a suitable oven.

In the tests carried out, the polymeric compositions of Examples 1–6 were coupled to a semiconducting screen constituted by a XLPE mix, commercially available under the trade name NCPE 0592™ (Borealis N.V., Bruxelles, Belgium).

According to the above described EFI methodology, 5 test-samples were produced for each polymeric composition, which were submitted to accelerated ageing in the following test conditions:

electric gradient: 5 kV/mm temperature: 70° C.

At the end of a 30-day period, 20 100 μm-thick sections were taken off from each test-piece, dyed with methylene blue according to the CIGRE standards and then examined with an optical microscope at a magnification of from 100 to 200×.

From such observation the density of water trees, expressed in number of trees per cm³, was then calculated for each test-sample. The mean values are shown in the following Table 1.

TABLE 1

| Example nr. | 1 | 2 | 3 | 4 | 5 | 6 |
|---|---|---|---|---|---|---|
| Trees density (nr./cm³) | 190 | 140 | 95 | 980 | 470 | 780 |

From the data shown in the table, it may be observed that the resistance to the water tree formation of the polymeric compositions of the invention (Examples 1–3), comprising ester groups and epoxy groups, is markedly greater that that offered by the control polymeric compositions, incorporating only acrylic groups (Example 5) or epoxy groups (Example 6).

In this connection, it has to be observed that, quite surprisingly, the combined effects of the above ester groups and epoxy groups is of a synergistic type, i.e., much greater than the sum of the individual effects ascribable to each of them considered in isolation.

This synergistic effect is so marked that, in the case of the composition of Example 3, a density of water trees has been observed whose order of magnitude was even lower than that of the cross-linked polyethylene taken as control.

EXAMPLE 8
(Evaluation of Dielectric Strength)

The dielectric strength properties of the polymeric compositions according to the previous Examples 1–6 were evaluated on test-samples obtained by the ageing methodology proposed by EFI, described in the preceding example.

In this case, 20 test-samples were produced which were submitted to accelerated water ageing in the following test conditions:

electric gradient: 5 kV/mm
temperature: 70° C.

On a batch of 5 non-aged test-samples (control) and on three batches of 5 test-samples taken after 7, 15 and 30 days respectively from the beginning of the accelerated electric ageing, the value of the dielectric strength was then measured according to the ASTM D-149 standard.

The dielectric strength tests were carried out with silicone oil in the inside and on the outside of the test-samples, using a circular electrode and applying a voltage gradient of 2 kV/s.

The results of the tests carried out (mean values of 5 tests) are shown in the following Table 2.

TABLE 2

| Example | | 1 | 2 | 3 | 4 | 5 | 6 |
|---|---|---|---|---|---|---|---|
| Strength (kV/mm) | as is | 120 | 130 | 135 | 105 | 120 | 110 |
| | 7 days | 60 | 75 | 85 | 55 | 60 | 58 |
| | 15 days | 55 | 70 | 80 | 45 | 50 | 47 |
| | 30 days | 55 | 70 | 75 | 45 | 50 | 47 |

From the data shown in the table, it may be observed that—after ageing—the dielectric strength of the polymeric compositions of the invention (Examples 1–3), is as a whole greater than that of the control compositions, independently from the original starting values, with an advantageous improvement of the insulating properties of the composition.

EXAMPLE 9
(Evaluation of the Loss Factor)

The evaluation of the so-called loss factor (tan delta) of the polymeric compositions according to the previous Examples 1–6 was carried out according to the ASTM D-150 standard (AC Loss Characteristics and Dielectric Constant (Permittivity) of Solid Electrical Insulating Material).

More particularly, the loss factor was measured by using as test-samples moulded flat plates of 20×20 cm of side, 1.0 mm thick, and using circular electrodes with guard ring.

Before taking the measures, the test-samples had been submitted to heat treatment at 90° C. in order to remove the cross-linking by-products in each plate.

The results of the tests performed (mean values out of 5 tests) are shown in the following Table 3.

TABLE 3

| Example nr. | 1 | 2 | 3 | 4 | 5 | 6 |
|---|---|---|---|---|---|---|
| tg delta (room T) | 0.0002 | 0.0003 | 0.0004 | 0.0001 | 0.0001 | 0.0010 |
| tg delta (90° C.) | 0.0008 | 0.0024 | 0.0110 | 0.0003 | 0.0004 | 0.0110 |

As it may be observed from the above table, the presence of ester groups and epoxy groups in the polymeric composition of the invention may bring about an increase in the loss factor; hence, the content of said groups may be selected having regard to the desired resistance characteristics to the formation of water trees and to the other performances required to the cable.

To this end, the optimum amount of ester groups and epoxy groups in the polymeric composition may be selected by a man skilled in the art in relation to the specific application requirements of the cable.

From what has been described and illustrated above it is immediately evident that the cable of the invention possesses a combination of features that render the same useable for all those applications—and in particular for power transmission at medium/high voltage—where a particular resistance to water treeing is required.

In particular, according to the invention, the use of ester groups and epoxy groups in predetermined amount in a given polymeric composition allows to increase the resistance to the phenomenon of water treeing compared to the case when—in the same polymeric composition—such groups are not present and, as a consequence, to increase, after electric water ageing, the dielectric strength of the insulation coating of a cable manufactured with the same polymeric base.

Obviously, those skilled in the art may introduce variants and modifications to the above described invention, in order to satisfy specific and contingent requirements, variants and modifications which fall anyhow within the scope of protection as is defined in the following claims.

What is claimed is:

1. An electric cable comprising at least one conducting core (2) and at least one insulation coating (5) obtained by extruding onto said conducting core a polymeric composition comprising an effective amount of a peroxide cross-linking agent and subsequently cross-linking the composition via peroxide, said composition further comprising from 3 to 30% by weight of a terpolymer having a Melt Index of from 0.1 g/10' to 40 g/10' obtained by polymerizing ethylene with i) at least one acrylic ester of the formula:

$$\underset{R_3}{CH}=\underset{R_1}{CH}-\underset{O}{\overset{\|}{C}}-O-R_2 \qquad (I)$$

wherein $R_1$ is H or $CH_3$, $R_2$ is an alkyl or aryl hydrocarbon group, linear or branched, preferably a phenyl, having 1 to 10 carbon atoms, and $R_3$ is hydrogen or an alkyl or aryl hydrocarbon group, linear or branched, preferably a phenyl, having 1 to 10 carbon atoms; and ii) at least one glycidyl ester of the formula:

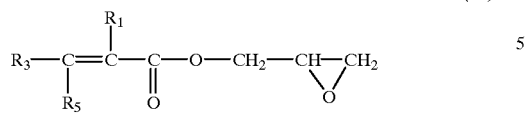
(IV)

wherein $R_3$ and $R_5$ are independently H, an alkyl or aryl hydrocarbon group, linear or branched, preferably a phenyl, having 1 to 10 carbon atoms; $R_1$ is H or $CH_3$, wherein the remainder of the polymeric composition is essentially constituted by a polyolefin polymeric base, wherein the polymeric composition includes, in parts by weight to the total weight thereof, from 0.5 to 15 parts of ester groups and from 0.01 to 5 parts of epoxy groups, said amounts of ester and epoxy groups, in combination, being such as to reduce the formation of water trees within the insulation coating (5) after electric ageing in water, and wherein said ester and epoxy groups are provided in the polymeric composition by said terpolymer.

2. An electric cable according to claim 1, characterized in that said at least one glycidyl ester is glycidyl methacrylate.

3. An electric cable according to claim 1, characterized in that said polyolefin polymeric base further comprises an effective amount of at least one antioxidant agent.

* * * * *